United States Patent
Huang et al.

(10) Patent No.: US 12,488,620 B2
(45) Date of Patent: Dec. 2, 2025

(54) SPATIOTEMPORAL ENHANCEMENT NETWORK BASED VIDEO ACTION RECOGNITION METHOD

(71) Applicant: SOOCHOW UNIVERSITY, Suzhou (CN)

(72) Inventors: He Huang, Suzhou (CN); Jianuo Yu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 26 days.

(21) Appl. No.: 18/032,158

(22) PCT Filed: Jul. 28, 2022

(86) PCT No.: PCT/CN2022/108524
§ 371 (c)(1),
(2) Date: Apr. 14, 2023

(87) PCT Pub. No.: WO2023/065759
PCT Pub. Date: Apr. 27, 2023

(65) Prior Publication Data
US 2024/0371203 A1    Nov. 7, 2024

(30) Foreign Application Priority Data

Oct. 18, 2021   (CN) .......................... 202111209904.1

(51) Int. Cl.
*G06V 40/20*   (2022.01)
*G06T 5/20*    (2006.01)
(Continued)

(52) U.S. Cl.
CPC ............... *G06V 40/20* (2022.01); *G06T 5/20* (2013.01); *G06V 10/62* (2022.01); *G06V 10/764* (2022.01); *G06V 10/771* (2022.01); *G06V 20/70* (2022.01)

(58) Field of Classification Search
CPC ........ G06V 40/20; G06V 40/28; G06V 40/23; G06V 20/52; G06T 7/20; G06F 3/017
See application file for complete search history.

(56) References Cited

U.S. PATENT DOCUMENTS

2012/0219229 A1    8/2012  Springer et al.
2017/0147872 A1*   5/2017  Maroy .................. A63F 13/833

FOREIGN PATENT DOCUMENTS

CN    111091045 A    5/2020
CN    111709304 A    9/2020
(Continued)

OTHER PUBLICATIONS

Fengwen Cheng, "From Coarse to Fine: Hierarchical Multi-scale Temporal Information Modeling via Sub-group Convolution for Video Action Recognition", Jul. 18, 2021 (Year: 2021).*

(Continued)

*Primary Examiner* — Andrew W Bee
*Assistant Examiner* — Caleb L Esquino
(74) *Attorney, Agent, or Firm* — SZDC Law PC

(57) ABSTRACT

The invention provides a spatiotemporal enhancement network based video action recognition method, including: S1. equally partitioning a video into T time periods, and randomly sampling one frame from each time period, to obtain an input sequence with T frames of image; S2. preprocessing the image sequence acquired in S1; S3. taking a tensor obtained in S2 as an input, inputting the tensor into a spatiotemporal enhancement network, by which spatial and temporal features are extracted; and S4. activating and normalizing the spatial and temporal features by softmax, averaging the normalized spatial and temporal features along a time dimension, obtaining classification scores of behaviors in videos through transformation, and then taking a label corresponding to the highest score as the classification result. A spatiotemporal enhancement module is embed- (Continued)

ded in a spatial network, so that better classification accuracy can be obtained by a deep learning based video behavior recognition system herein.

9 Claims, 4 Drawing Sheets

(51) Int. Cl.
  *G06V 10/62* (2022.01)
  *G06V 10/764* (2022.01)
  *G06V 10/771* (2022.01)
  *G06V 20/70* (2022.01)

(56) References Cited

FOREIGN PATENT DOCUMENTS

| | | | |
|---|---|---|---|
| CN | 112070677 A | 12/2020 | |
| CN | 112464835 A | 3/2021 | |
| CN | 114037930 A | 2/2022 | |

OTHER PUBLICATIONS

Aytekin Nebisoy, "Video Action Recognition Using spatio-temporal optical flow video frames", Feb. 5, 2021 (Year: 2021).*
Zhen Gao, "Averaging Video Sequences to Improve Action Recognition", 2016 (Year: 2016).*
Ian Goodfellow, "Deep Learning", 2016 (Year: 2016).*
Mark Sandler, "MobileNetV2: Inverted Residuals and Linear Bottlenecks", 2018 (Year: 2018).*
Daquan Zhou, "Rethinking Bottleneck Structure for Efficient Mobile Network Design", 2020 (Year: 2020).*
Min-Seok Kang, "Efficient Spatio-Temporal Modeling Methods for Real-Time Violence Recognition", May 2021 (Year: 2021).*
Tarique Hussain, "EMO-MoviNet: Enhancing Action Recognition in Videos with EvoNorm, Mish Activation, and Optimal Frame Selection for Efficient Mobile Deployment", Sep. 2023 (Year: 2023).*

* cited by examiner

SPATIOTEMPORAL ENHANCEMENT NETWORK BASED VIDEO ACTION RECOGNITION METHOD

This application is the National Stage Application of PCT/CN2022/108524, filed on Jul. 28, 2022, which claims priority to Chinese Patent Application No. CN 202111209904.1, filed on Oct. 18, 2021, which is incorporated by reference for all purposes as if fully set forth herein.

FIELD OF THE INVENTION

The present invention relates to the fields of deep learning and image processing, and specifically to a spatiotemporal enhancement network based video action recognition method.

DESCRIPTION OF THE RELATED ART

With the rapid development of Internet technology and big data science, the number of videos available to people through the Internet has exploded. How to extract effective information from video images has become a matter of great concern. To extract information from videos, it is required to quickly understand and interpret the content of videos according to certain rules. Obviously, with the rapid growth in the number of videos, understanding and analyzing videos by manual means are difficult to meet the current needs. Therefore, intelligent automation is required to accomplish these corresponding tasks. As a fundamental problem of video understanding, the recognition of behaviors in video images has a very wide range of applications in practical engineering fields such as video auditing, gesture recognition, and security surveillance. During recent years, research on deep learning theory has made great progress and been successfully used for problems such as image processing. Therefore, the study of deep learning based video action recognition has very important theoretical significance and potential applications.

In existing research, 3D convolutional neural networks or 2D convolutional neural networks have been commonly used to deal with action recognition problems in video images. A two-stream structure is usually used for a 2D convolutional neural network based action recognition method. The basic idea is that the temporal and spatial modeling of action behavior is implemented by using the input optical flows and spatial flow information of RGB images for different frames of a video, and temporal flow information and spatial flow information are fully fused and finally inputted into a suitable classifier to obtain the action recognition results. Compared with the conventional single-stream structure convolutional neural network, the performance of the two-stream structure convolutional neural network in video action recognition is significantly improved due to the utilization of optical flow information. However, this performance improvement is built on the cost of expensive optical flow computation. In addition, another shortcoming of video approaches based on the two-stream structure is that 2D convolutional neural network is usually used to extract temporal stream information, and therefore leads to insufficient ability to model the long-term temporal information. In contrast, 3D convolution kernels were proposed in 3D convolutional neural networks to effectively extract the spatiotemporal information in video images. The advantage of introducing 3D convolution kernels is that with the deeper structure and increasing receptive fields, 3D convolutional neural networks are more beneficial to extract rich temporal information from video images. On the other hand, 3D convolutional neural networks can also obtain the spatial information directly from the input RGB images, thereby avoiding the computationally expensive optical flow extraction process. However, due to the introduction of 3D convolution kernels, action recognition methods based on 3D convolutional neural networks still suffer from the shortcomings of high computational cost and slow computing speed. Recently, some studies have combined 3D convolutional neural networks and two-stream structures to improve the accuracy of behavior recognition. Similarly, as analyzed above, the computational cost of combining the two methods is obviously very high, and therefore it is difficult to widely applied in practice. At the same time, some scholars are studying new methods for processing the temporal flow information, and exploring how to combine with 2D convolutional neural networks to achieve effective extraction of spatial and temporal information. In this way, the lightweight and high efficiency of 2D convolutional neural networks can be fully utilized, and excessive changes to the pre-trained 2D convolutional neural networks can be avoided. However, this approach tends to have poor portability. Therefore, it is worthwhile to further explore the integration of temporal flow information processing methods with 2D convolutional neural networks for in-depth research.

Conventional technologies have the following technical problems.
1. Deep convolutional neural network model based on a two-stream network has insufficient long-term modeling ability for video images, which affects the performance of action behavior recognition. On the other hand, the relatively expensive cost of the optical flow extraction in the two-stream structure is not conducive to its application in practice.
2. 3D convolutional neural network based video behavior recognition methods have high computational cost and slow running speed.
3. 2D convolutional neural networks have difficulty in adequately representing the correlation of spatial and temporal features of motion information in video images, resulting in poor recognition accuracy.

SUMMARY OF THE INVENTION

The technical problem to be solved by the present invention is to provide a spatiotemporal enhancement network based video action recognition method. A spatiotemporal enhancement network model (STEN) is proposed based on MobileNet V2 to solve the action recognition problem of video images. An attention mechanism of spatial and temporal correlation information is introduced to solve the problem that 2D convolutional neural networks cannot effectively extract the spatial and temporal information and has poor recognition accuracy. A spatiotemporal enhancement module is designed to implement the efficient representation of spatial features of motion information in video images. A deep convolutional neural network model based on a spatiotemporal enhancement module for video action recognition has a relatively small number of parameters and computation leading to a fast running speed. An end-to-end system architecture is adopted such that the implementation is easy.

To resolve the foregoing technical problems, the present invention provides a spatiotemporal enhancement network based video action recognition method, including:

S1. equally partitioning a video into T time periods, and randomly sampling one frame from each time period, to obtain an input sequence having T frames of image;

S2. preprocessing the image sequence acquired in S1;

S3. taking a tensor obtained in S2 as an input, inputting the tensor into a spatiotemporal enhancement network, and extracting spatial and temporal features by the model; and S4. activating and normalizing the spatial and temporal features obtained in S3 by softmax, averaging the normalized spatial and temporal features along a time dimension, finally obtaining classification scores of behaviors in videos through transformation, and then taking a label corresponding to the highest score as the classification result.

In an embodiment, a specific procedure of step S3 is:

S3-1. taking MobileNet V2 with 17 bottlenecks as a basic network, and embedding a designed spatiotemporal enhancement module in the 3rd, 5th, 6th, 8th, 9th, 10th, 12th, 13th, 15th, and 16th bottlenecks of the basic network to obtain the spatiotemporal enhancement network;

S3-2. to ensure a long-term modeling capability of the spatiotemporal enhancement network, cascading a 1D convolutional kernel with a size of 3 before the spatiotemporal enhancement module; and S3-3. implementing the spatiotemporal enhancement module in a form of residual block, wherein a residual function of the spatiotemporal enhancement module is $x_{n+1}=x_n+A(x_n,W_n)$, $A(x_n,W_n)$ is a spatiotemporal enhancement part, and steps of the spatiotemporal enhancement part are: performing spatial averaging on input features respectively along a length dimension and a width dimension, then performing activation respectively by softmax, then performing matrix multiplication to obtain a spatial correlation map, and multiplying the map after time convolution by the original input to activate a part of the input features having rich motion information.

In an embodiment, the structure of MobileNet V2 used in step S3-1 is: image features are firstly extracted by a 3×3 convolution layer, and a feature map with a size of [NT,32, 112, 112] is obtained from a frame of image with a size of [NT,3,224,224]; the obtained feature map then sequentially passes through the 17 bottlenecks and one 1×1 convolution to obtain a feature map with a size of [NT,1280,7,7]; and finally the obtained feature map undergoes the average pooling and is then fed into a fully connected layer to obtain the NT×CLS features, wherein CLS represents the number of categories of video behaviors.

In an embodiment, a specific procedure of step S3-2 is:

performing the transformation and shifting operations on the input features to change the dimensions of the input features from [NT,C,H,W] as [N×H×W,C,T];

extracting the temporal information by using 1D convolutional kernel with a size of 3; and restoring the dimensions of the features after convolution into [NT,C,H,W] by using transformation and shifting.

In an embodiment, 1D channel separable convolution is used in the foregoing step, the first eighth part of channels of the convolution are initialized as (0,0,1), the second eighth part of channels are initialized as (1,0,0), and the remaining three quarters of channels are initialized as (0,1, 0).

In an embodiment, in step S3-3, the spatiotemporal enhancement module is embedded in front of the first convolution operation of a bottleneck using a residual form, the module consists of two parts in parallel: the first part is the original input, and the second part is the spatiotemporal enhancement; a specific process of the spatiotemporal enhancement module comprises: assuming that the dimensions of an input feature X are [NT,C,H,W], wherein N is a batch size, that is, the number of videos, T is a number of frames sampled in each video, and represents the time dimension, C is a number of channel, H and W are respectively a length and a width, and NT=N×T; making the input feature X pass through a 1×1 convolution to obtain a feature $X^r$ with dimensions of [NT,C/r,H,W], wherein a purpose of this step is to reduce the calculation amount, performing the spatial averaging on $X^r$ respectively along the length dimension and the width dimension and performing activation respectively by softmax, then performing matrix multiplication to obtain the spatial correlation map, making the map pass through the time convolution and then pass through a 1×1 convolution to restore the channel dimension of the map into C, and subsequently performing sigmoid activation and multiplication with the original input to activate the part of the input feature having rich temporal information; the foregoing process of spatiotemporal enhancement is described as $A(x_n, W_n)$; and finally, an output of the spatiotemporal enhancement module is obtained through $x_{n+1}=x_n+A(x_n, W_n)$.

In an embodiment, a normalization operation is performed on the feature with dimensions of NT×CLS obtained in S3 by using softmax in step S4, and the softmax is defined as:

$$softmax(x) = \frac{e^{\beta x_i}}{\sum_j e^{\beta x_j}},$$

wherein subsequently the dimensions of the processed feature are changed as [N,T,CLS] through transformation, averaging is performed along the time dimension of the feature, then the obtained feature is transformed into [N,CLS], in this case, the classification scores of the behaviors in the videos are obtained, and then the label corresponding to the highest score is taken as the classification result.

Based on the same inventive concept, the present application further provides a computer device, including a memory, a processor, and a computer program stored in the memory and configured to be executed by the processor, where the processor is configured to execute the program to implement the steps in any foregoing method.

Based on the same inventive concept, the present application further provides a computer-readable storage medium, on which a computer program is stored, where a processor is configured to execute the program to implement the steps in any foregoing method.

Based on the same inventive concept, the present application further provides a processor, configured to execute a program, where the program is executed to implement any foregoing method.

The beneficial effects of the invention are as follows:

1. A spatiotemporal enhancement module is embedded in a spatial network, such that higher classification accuracy can be obtained for behavior recognition of videos by a deep learning based video action recognition system provided in the present invention. 2. The spatiotemporal enhancement module enables the network to focus more on an area having rich temporal information, and therefore efficient extraction of spatial and temporal information is guaranteed. 3. The use of MobileNet V2 as a basic model greatly reduces the operation complexity and running time of the model. 4. The model uses only an RGB frame image as an input and does not involve any auxiliary network. Therefore, the structure is simple with a small number of parameters.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

In a deep learning based video action recognition system provided in the present invention, a spatiotemporal enhancement network is constructed. Efficient extraction of spatial and temporal information is implemented by embedding a spatiotemporal enhancement module in MobileNet V2. The spatiotemporal-enhancement module can implement the enhancement of the spatial aspect of motion information based on the intensity of spatial correlation of the motion information. Because the spatiotemporal enhancement module is embedded into MobileNet V2, the model is lightweight and ensures high efficiency. Benefiting from the designed spatiotemporal enhancement module, the model also has substantial spatial and temporal information extraction capability. Table 1 shows the overall structure of the model, where t is a spreading parameter in MobileNet V2, c is a channel number after each operation, n is a number that each operation is repeated, and s is a step size of related convolution in an operation.

TABLE 1

| Input | Operator | t | c | n | s |
|---|---|---|---|---|---|
| T × 3 × $224^2$ | Conv2d 3 × 3 | — | 32 | 1 | 2 |
| T × 32 × $112^2$ | Bottleneck | 1 | 16 | 1 | 1 |
| T × 16 × $112^2$ | Bottleneck | 6 | 24 | 2 | 2 |
| T × 24 × $56^2$ | Bottleneck | 6 | 32 | 3 | 2 |

TABLE 1-continued

| Input | Operator | t | c | n | s |
|---|---|---|---|---|---|
| T × 32 × $28^2$ | Bottleneck | 6 | 64 | 4 | 2 |
| T × 64 × $14^2$ | Bottleneck | 6 | 96 | 3 | 1 |
| T × 96 × $14^2$ | Bottleneck | 6 | 160 | 3 | 2 |
| T × 160 × $7^2$ | Bottleneck | 6 | 320 | 1 | 1 |
| T × 320 × $7^2$ | Conv2d 1 × 1 | — | 1280 | 1 | 1 |
| T × 1280 × $7^2$ | Avgpool | — | 1280 | 1 | — |
| T × 1280 × $1^2$ | FC, Softmax | — | CLS | — | — |
| T × CLS | Temporal average | — | CLS | — | — |

Figure 1:
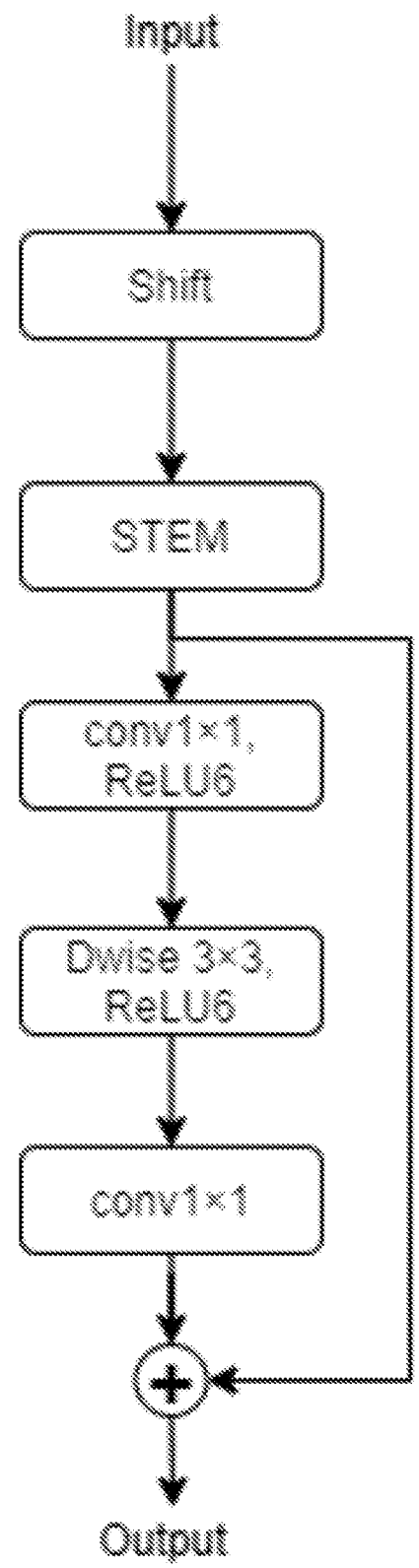
FIG. 1 is a schematic structural diagram of bottlenecks in a spatiotemporal enhancement network based video action recognition method according to the present invention.
Figure 2:
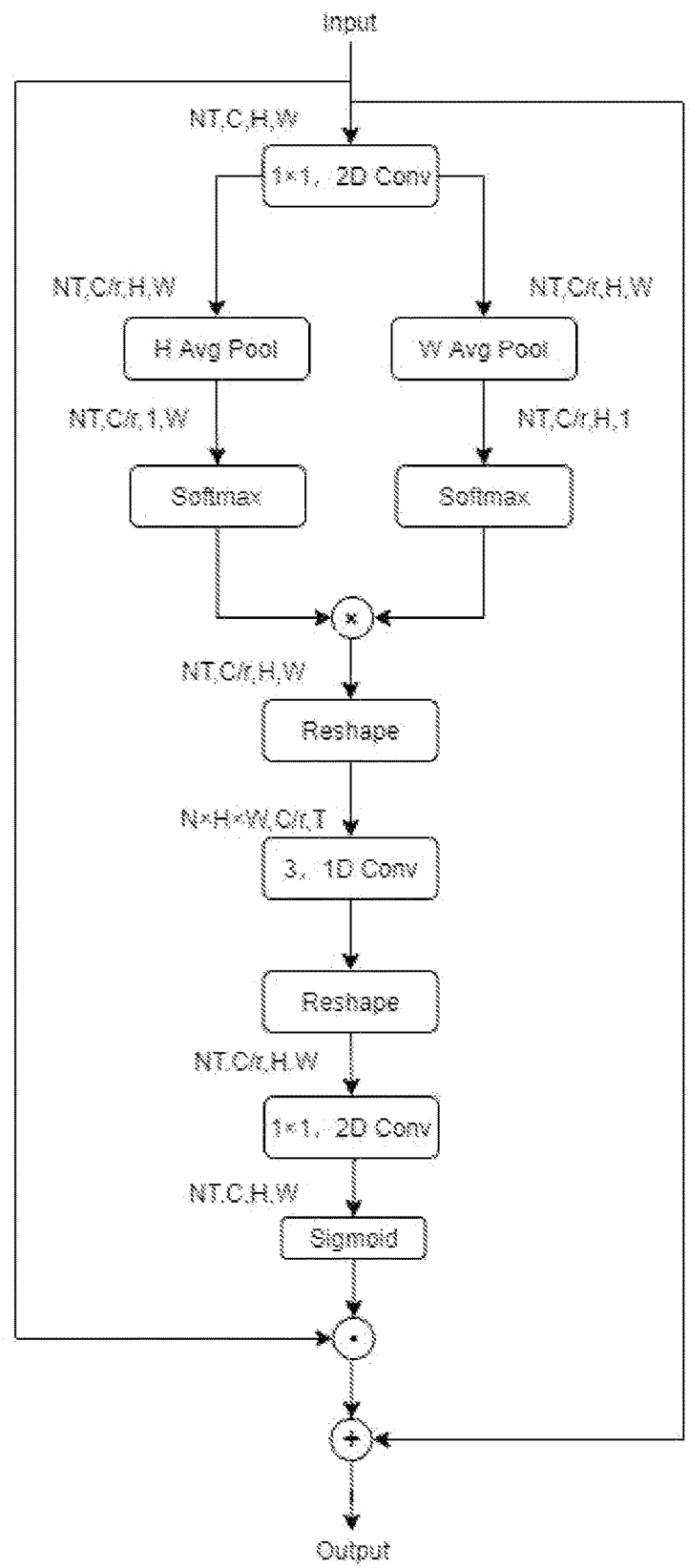
FIG. 2 is a schematic structural diagram of an STEM module in a spatiotemporal enhancement network based video action recognition method according to the present invention.

FIG. 1 shows a result of embedding a spatiotemporal enhancement module into the bottleneck (InvertedResidual) of MobileNet V2. FIG. 2 shows a structure of the proposed spatiotemporal enhancement module. A specific procedure of solving video action recognition using the model is as follows:

S1. Equally partition a video into T time periods, and randomly sampling one frame from each time period, to obtain an input sequence having T frames of image. In this way, a long-term change trend of video images can be modeled, and the robustness of the model can be enhanced.

S2. Preprocess the image sequence acquired in S1, to change the video frame image sequence into a tensor with dimensions of [NT,3,224,224], where NT=N×T, N is a video quantity, and T is a quantity of frames of image sampled from each video. This patent is described with N=1 and T=8.

S3. Take a tensor obtained in S2 as an input, inputting the tensor into a spatiotemporal enhancement network, and extracting spatial and temporal features by the model.

S4. Activate and normalizing the spatial and temporal features obtained in S3 by softmax, averaging the normalized spatial and temporal features along a time dimension, finally obtaining classification scores of behaviors in videos through transformation, and then taking a label corresponding to the highest score as the classification result.

A specific procedure of step S3 is as follows:

S3-1. Take MobileNet V2 with 17 bottlenecks as a basic network, and embedding a designed spatiotemporal enhancement module in the 3rd, 5th, 6th, 8th, 9th, 10th, 12th, 13th, 15th, and 16th bottlenecks of the basic network to obtain the spatiotemporal enhancement network.

S3-2. To ensure a long-term modeling capability of the spatiotemporal enhancement network, cascading a 1D convolutional kernel with a size of 3 before the spatiotemporal enhancement module.

S3-3. Implement the spatiotemporal enhancement module in a form of residual block, wherein a residual function of the spatiotemporal enhancement module is $X_{n+1}=x_n+A(x_n, W_n)$, $A(x_n, W_n)$ is a spatiotemporal enhancement part, and steps of the spatiotemporal enhancement part are: performing spatial averaging on input features respectively along a length dimension and a width dimension, then performing activation respectively by softmax, then performing matrix multiplication to obtain a spatial correlation map, and multiplying the map after time convolution by the original input to activate a part of the input features having rich motion information.

Figure 3:
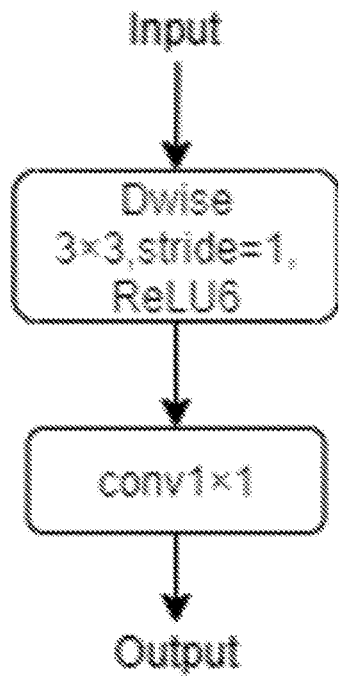
FIG. 3 shows the first kind of the bottleneck structure of a basic model MobileNet V2 in a spatiotemporal enhancement network based video action recognition method according to the present invention.
Figure 4:
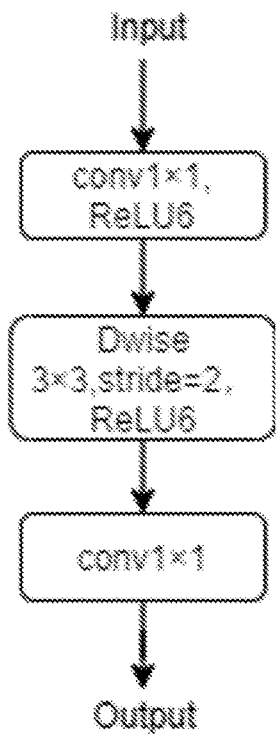
FIG. 4 shows the second kind of the bottleneck structure of a basic model MobileNet V2 in a spatiotemporal enhancement network based video action recognition method according to the present invention.
Figure 5:
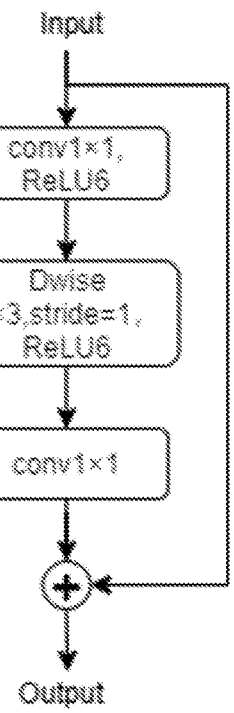
FIG. 5 shows the third kind of the bottleneck structure of a basic model MobileNet V2 in a spatiotemporal enhancement network based video action recognition method according to the present invention.

The structure of MobileNet V2 used in step S3-1 is: image features are firstly extracted by a 3×3 convolution layer, and a feature map with a size of [NT,32,112,112] is obtained from a frame of image with a size of [NT,3,224,224]; the obtained feature map then sequentially passes through the 17 bottlenecks and one 1×1 convolution to obtain a feature map with a size of [NT,1280,7,7]; and finally the obtained feature map undergoes the average pooling and is then fed into a fully connected layer to obtain the NT×CLS features, wherein CLS represents the number of categories of video behaviors. The formation of bottlenecks of MobileNet V2 have three forms, which are respectively shown in FIG. 3, FIG. 4, and FIG. 5. Parts using a residual form are modified in this patent (FIG. 5).

In step S3-2, the following steps are designed:
1. performing the transformation and shifting operations on the input features to change the dimensions of the input features from [NT,C,H,W] as [N×H×W,C,T];
2. extracting the temporal information by using 1D convolutional kernel with a size of 3; and
3. restoring the dimensions of the features after convolution into [NT,C,H,W] by using transformation and shifting.

1D channel separable convolution is used, the first eighth part of channels of the convolution are initialized as (0,0,1), the second eighth part of channels are initialized as (1,0,0), and the remaining three quarters of channels are initialized as (0,1,0). The use of channel separable convolution can make an extraction process of temporal information purer. The foregoing initialization operation is to more effectively utilize a pretrained network, thereby improving the convergence efficiency and accuracy of the model.

In step S3-3, the spatiotemporal enhancement module is embedded in front of the first convolution operation of a bottleneck using a residual form, the module consists of two parts in parallel: the first part is the original input, and the second part is the spatiotemporal enhancement; a specific process of the spatiotemporal enhancement module comprises: assuming that the dimensions of an input feature X are [NT,C,H,W], wherein N is a batch size, that is, the number of videos, T is a number of frames sampled in each video, and represents the time dimension, C is a number of channel, H and W are respectively a length and a width, and NT=N×T; making the input feature X pass through a 1×1 convolution to obtain a feature $X^r$ with dimensions of [NT,C/r,H,W], wherein a purpose of this step is to reduce the calculation amount, performing the spatial averaging on $X^r$ respectively along the length dimension and the width dimension and performing activation respectively by softmax, then performing matrix multiplication to obtain the spatial correlation map, making the map pass through the time convolution and then pass through a 1×1 convolution to restore the channel dimension of the map into C, and subsequently performing sigmoid activation and multiplication with the original input to activate the part of the input feature having rich temporal information; the foregoing process of spatiotemporal enhancement is described as $A(x_n, W_n)$; and finally, an output of the spatiotemporal enhancement module is obtained through $X_{n+1}=x_n+A(x_n, W_n)$. Such a residual form may keep background information while implementing the enhancement of short-term motion information.

A normalization operation is performed on the feature with dimensions of NT×CLS obtained in S3 by using softmax in step S4, and the softmax is defined as:

$$softmax(x) = \frac{e^{\beta x_i}}{\sum_j e^{\beta x_j}},$$

where subsequently the dimensions of the processed feature are changed into [N,T,CLS] through transformation, averaging is performed along the time dimension of the feature, then the obtained feature is transformed into [N,CLS], in this case, the classification scores of the behaviors in the videos are obtained, and then the class of the highest score is taken as the classification category to obtain the calculated classification result.

One specific application scenario of the present invention is as follows:

The whole video behavior recognition system is firstly required to train on a dataset with labeled samples before it can facilitate for practical test and applications. Specific training steps are:

1. Extract Some Frames of Images from a Video

A color video is equally divided into T time periods, and one frame is randomly sampled from each time period. In this way, an input image sequence with T frames is obtained.

2. Data Augmentation

Data augmentation is performed on the obtained input image sequence. This operation can produce more data for training based on previously obtained images. In fact, data augmentation has been widely applied in the field of deep learning because the operation can effectively avoid overfitting.

(1) Corner cropping: An area is extracted from a corner or the center of an image to avoid focus on the center of the image by default.

(2) Scale jittering: This step includes the following steps:
An input image is fixed as the size of 256×340.
The widths and heights of areas to be cropped are randomly selected from {256,224,192,168}.
The sizes of these areas to be cropped are adjusted to be 224×224.

In fact, the foregoing steps include scale jittering and aspect ratio jittering.

(3) Random horizontal rotation: Some images belonging to the same video in a dataset are randomly rotated transversely with respect to a central axis.

An image frame sequence that has undergone a series of the above operations is inputted into the network.

3. Training Process

Figure 6:
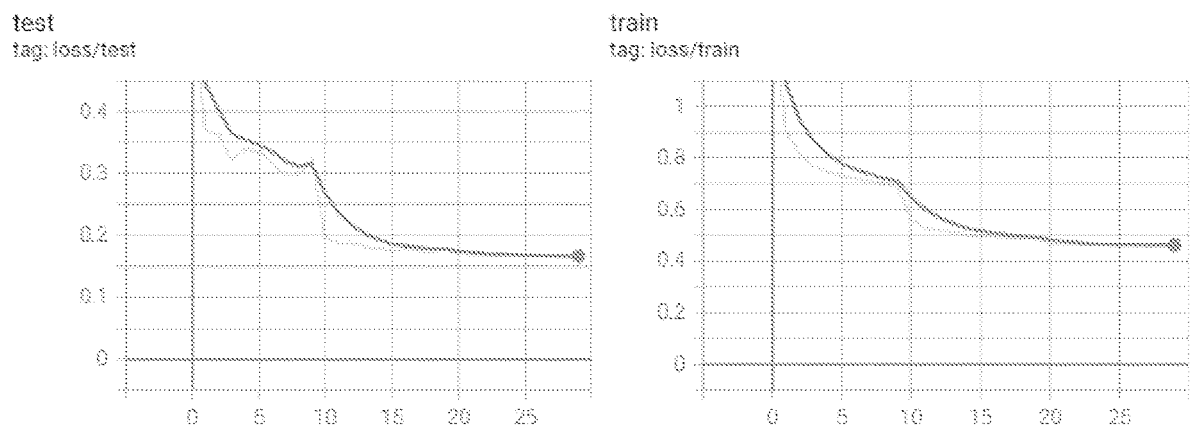
FIG. 6 shows a training curve and a test curve of the loss function on the Jester dataset in a spatiotemporal enhancement network based video action recognition method according to the present invention.

A loss function used in the present invention is a cross-entropy loss function, and an optimization algorithm is an SGD optimization algorithm, which is a classic algorithm for classification problems. FIG. 6 shows a training curve and a test curve on the Jester dataset achieved by the model in the present invention. Table 2 shows the recognition accuracy of the model.

TABLE 2

| Model | Accuracy |
| --- | --- |
| Spatiotemporal enhancement network model | 95.232 |

The key ideas of the present invention are as follows:
1. The constructed spatiotemporal enhancement module has high portability and can be conveniently embedded at different positions in different basic models.
2. The spatiotemporal enhancement module enables the network to focus more on a spatial area having rich temporal information, such that the representation ability of the model is improved.
3. The model only uses an RGB image as an input, does not involve any auxiliary network, and is an end-to-end structure. Therefore, the structure is simple with the small number of parameters.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A spatiotemporal enhancement network based video action recognition method, comprising:
   S1, equally partitioning a video into T time periods, and randomly sampling one frame from each time period, to obtain an input sequence having T frames of image;
   S2, preprocessing the image sequence acquired in S1;
   S3, taking a tensor obtained in S2 as an input, inputting the tensor into a spatiotemporal enhancement network, and extracting spatial and temporal features by a model; and
   S4, activating and normalizing the spatial and temporal features obtained in S3 by softmax, averaging the normalized spatial and temporal features along a time dimension, finally obtaining classification scores of behaviors in videos through transformation, and then taking a label corresponding to a highest score as a classification result,
   wherein the step S3 comprises:
   S3-1, taking MobileNet V2 with 17 bottlenecks as a basic network, and embedding a designed spatiotemporal enhancement module in the 3rd, 5th, 6th, 8th, 9th, 10th, 12th, 13th, 15th, and 16th bottlenecks of the basic network to obtain the spatiotemporal enhancement network;
   S3-2, to ensure a long-term modeling capability of the spatiotemporal enhancement network, cascading a 1D convolutional kernel with a size of 3 before the spatiotemporal enhancement module; and
   S3-3, implementing the spatiotemporal enhancement module in a form of residual block, wherein a residual function of the spatiotemporal enhancement module is $x_{n+1}=x_n+A(x_n, W_n)$, $A(x_n, W_n)$ is a spatiotemporal enhancement part, and steps of the spatiotemporal enhancement part are: performing spatial averaging on input features respectively along a length dimension and a width dimension, then performing activation respectively by softmax, then performing matrix multiplication to obtain a spatial correlation map, and multiplying the map after time convolution by an original input of the spatiotemporal enhancement module to activate a part of the input features having rich motion information.

2. The spatiotemporal enhancement network based video action recognition method according to claim 1, wherein the structure of MobileNet V2 used in the step S3-1 is: image features are firstly extracted by a 3×3 convolution layer, and a first feature map with a size of [NT,32, 112,112] is obtained from a frame of image with a size of [NT,3,224, 224]; the first feature map then sequentially passes through the 17 bottlenecks and one 1×1 convolution to obtain a second feature map with a size of [NT, 1280,7,7]; and finally the second feature map undergoes an average pooling and is then fed into a fully connected layer to obtain NT×CLS features, wherein CLS represents a number of categories of video behaviors.

3. The spatiotemporal enhancement network based video action recognition method according to claim 1, wherein the step S3-2 comprises:
   performing transformation and shifting operations on the input features to change the dimensions of the input features from [NT,C,H,W] as [N×H×W,C,T];
   extracting temporal information by using 1D convolutional kernel with a size of 3; and
   restoring the dimensions of the features after convolution into [NT,C,H,W] by using transformation and shifting.

4. The spatiotemporal enhancement network based video action recognition method according to claim 3, wherein 1D channel separable convolution is used, a first eighth part of channels of the convolution are initialized as (0,0,1), a second eighth part of channels are initialized as (1,0,0), and a remaining three quarters of channels are initialized as (0,1,0).

5. The spatiotemporal enhancement network based video action recognition method according to claim 1, wherein in the step S3-3, the spatiotemporal enhancement module is embedded in front of a first convolution operation of a bottleneck using a residual form, the module consists of two parts in parallel: a first part is the original input, and a second part is the spatiotemporal enhancement; a specific process of the spatiotemporal enhancement module comprises: assuming that the dimensions of an input feature X are [NT,C,H,W], wherein N is a batch size, that is, a number of videos, T is a number of frames sampled in each video, and represents the time dimension, C is a number of channel, H and W are respectively a length and a width, and NT=N×T; making the input feature X pass through a 1×1 convolution to obtain a feature $X^r$ with dimensions of [NT,C/r,H, W], wherein a purpose of the step S3-3 is to reduce the calculation amount, performing the spatial averaging on $X^r$ respectively along the length dimension and the width dimension and performing activation respectively by softmax, then performing matrix multiplication to obtain the spatial correlation map, making the map pass through the time convolution and then pass through a 1×1 convolution to restore the channel dimension of the map into C, and subsequently performing sigmoid activation and multiplication with the original input of the spatiotemporal enhancement module to activate the part of the input feature having rich temporal information; the foregoing process of spatiotemporal enhancement is described as $A(x_n, W_n)$; and finally, an output of the spatiotemporal enhancement module is obtained through $x_{n+1}=x_n+A(x_n, W_n)$.

6. The spatiotemporal enhancement network based video action recognition method according to claim 1, wherein a normalization operation is performed on a feature with dimensions of NT×CLS obtained in the step S3 by softmax in the step S4, and the softmax is defined by $$softmax(x) = \frac{e^{\beta x_i}}{\sum_j e^{\beta x_j}},$$

wherein subsequently the dimensions of a processed feature are changed as [N,T,CLS] through transformation, averaging is performed along the time dimension of the feature, then the obtained feature is transformed into [N,CLS], in this case, the classification scores of the behaviors in the videos are obtained, and then the label corresponding to the highest score is taken as the classification result.

7. A computer device, comprising: a memory, a processor, and a computer program stored in the memory and configured to be executed by the processor, wherein the processor is configured to execute the program to implement the steps in the method according to claim 1.

8. A non-transitory computer-readable storage medium, on which a computer program is stored, wherein a processor is configured to execute the program to implement the steps in the method according to claim 1.

9. A processor, configured to execute a program, wherein the program is executed to implement the method according to claim 1.

\* \* \* \* \*